(12) United States Patent
Bacarella et al.

(10) Patent No.: US 7,746,727 B2
(45) Date of Patent: Jun. 29, 2010

(54) FISH FINDER MOUNTING BRACKET

(76) Inventors: John P. Bacarella, 23189 N. Remick Dr., Clinton Township, MI (US) 48036; Philip D. Morse, 21212 Ardmore, Clinton Township, MI (US) 48081

( * ) Notice: Subject to any disclaimer, the term of this patent is extended or adjusted under 35 U.S.C. 154(b) by 4 days.

(21) Appl. No.: 12/118,798

(22) Filed: May 12, 2008

(65) Prior Publication Data
US 2009/0278005 A1 Nov. 12, 2009

(51) Int. Cl.
*A47B 96/06* (2006.01)
(52) U.S. Cl. .................. 367/173; 248/205.1; 248/213.2
(58) Field of Classification Search .................. 367/173; 248/205.1, 213.2
See application file for complete search history.

(56) References Cited

U.S. PATENT DOCUMENTS

| | | | |
|---|---|---|---|
| 3,659,369 A * | 5/1972 | Hermanson | 43/21.2 |
| 3,989,213 A * | 11/1976 | Allen | 248/214 |
| 4,845,881 A | 7/1989 | Ward | |
| 4,949,497 A | 8/1990 | Lindell | |
| 5,230,646 A * | 7/1993 | Thorup | 367/173 |
| 5,303,500 A | 4/1994 | Luukonen | |
| 6,170,189 B1 | 1/2001 | Klein | |
| 6,374,532 B1 | 4/2002 | Klein | |
| 6,715,230 B1 | 4/2004 | Klein | |
| 2006/0050615 A1* | 3/2006 | Swisher | 367/173 |
| 2008/0205048 A1* | 8/2008 | Andrews | 362/156 |

* cited by examiner

*Primary Examiner*—Ian J Lobo
(74) *Attorney, Agent, or Firm*—Young Basile Hanlon & MacFarlane, PC

(57) ABSTRACT

A bracket for mounting a fish finder display head to a conventional multi-gallon plastic pail is described with reference to two alternative embodiments. In the first embodiment, the bracket comprises spaced apart arms to provide a gimbal style mount and the arms have inboard, upwardly extending hooks to fit over the peripheral edge of the pail. In the second embodiment, the arms are combined with a stabilizer member and may be attached directly to the outside surface of the pail by means of threaded fasteners or Bungee cords or both. In both embodiments, a tip-over guard is provided in the form of a generally U-shaped of aluminum stock that is attached such as by rivets to the distal (outside) ends of the bracket arms. Means are provided for wrapping a power cable between the arms.

7 Claims, 3 Drawing Sheets

FISH FINDER MOUNTING BRACKET

FIELD OF THE INVENTION

This invention relates to fish finders and more particularly to a bracket for mounting a fish finder display head to, for example, the outside surface of a multi-gallon bucket or pail.

BACKGROUND OF THE INVENTION

It is common for fishermen, particularly those who fish through the ice covering frozen lakes, to carry gear to the fishing site and/or to carry their "catch" home from the fishing Site in a multi-gallon bucket or pail. It is also common for such fishermen to employ a sonic type fish finder, commonly known as a "flasher", to assist in locating fish at the fishing site. One prior art device shows a device for mounting the fish finder to a bucket in such a way as the display head is disposed over the open top of the bucket. This mounting arrangement interferes with the normal uses of the bucket, particularly the use of the bucket as a seat which is achieved by plug-mounting a cushioned insert into the top of the bucket.

SUMMARY OF THE INVENTION

The present invention provides a bracket for mounting a fish finder to, for example, the outside surface of a multi-gallon bucket or pail in such a way as to provide little or no interference to the use of the bucket in the manners described above as well as providing one or more advantageous conveniences as hereinafter described. The bracket may be used additionally or alternatively to mount a fish finder to other objects.

In general, the bracket of the present invention comprises a pair of spaced apart parallel arms and one of several means for attaching the arms to a support such as a bucket in such a way as to cause the arms to extend outwardly from a vertical surface to receive between the distal ends thereof the fish finder unit. Typically, the fish finder is of the type having a display head body with inline, hand-turned screws threaded into opposite sides thereof. The arms of the bracket are provided with holes to receive the hand screws so as to provide a gimbal type mount for the display head body.

In one form, hereinafter described, the means for attaching comprises, integral with said arms, hook-shaped straps which are sized and shaped to extend upwardly along the outside surface of a pail and hook over the top peripheral edge thereof. In another form, the attachment means comprises a connector bar integrally extending between the bracket arms to conformingly lie against a vertical surface such as the outside surface of a bucket such that the entire bracket may be secured to the bucket with, for example, either Bungee cords or screws or a combination thereof.

In both embodiments, the bracket is preferably provided with a tip-over guard in the form of a U-shaped strap of rigid material such as aluminum which is attached to and extends between and below the ends of the arms when the bracket is mounted to a vertical surface. Thus, should the bucket tip over in the direction of the display head, the tip-over guard will hit the ground or ice first and will help prevent damage to the display head and other components.

As hereinafter described, further conveniences may be provided as optional features to the fish finder mounting bracket. These optional features include a pair of ears attached to and extending upwardly from respective mounting arms such that a transducer cable extending from the display head to an in water sonic transducer may be wound around and between the ears when desired. Such optional accessories further include a rod holder conveniently attached to one of the arms to form a socket into which the butt end of a fishing rod may be inserted.

BRIEF DESCRIPTION OF THE DRAWINGS

The various features and advantages of the invention will be best understood from a reading of the following specification which is to be taken with the accompanying drawings in which.

DETAILED DESCRIPTION OF THE ILLUSTRATIVE EMBODIMENTS

Figure 1:
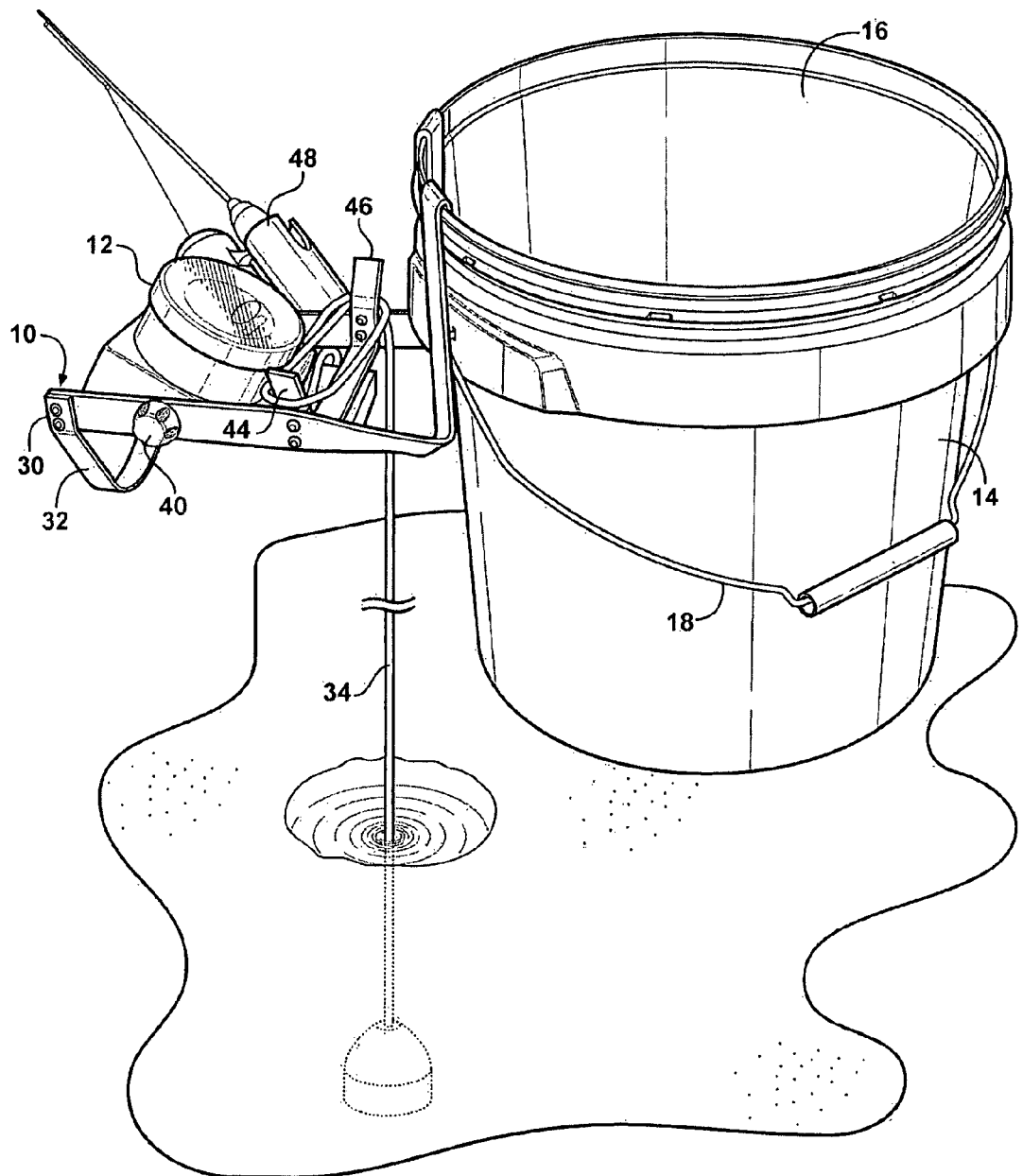
FIG. 1 is a perspective view of a first embodiment of the invention exhibiting optional features thereof and attached to the outside surface of a six-gallon plastic pail.
Figure 2:
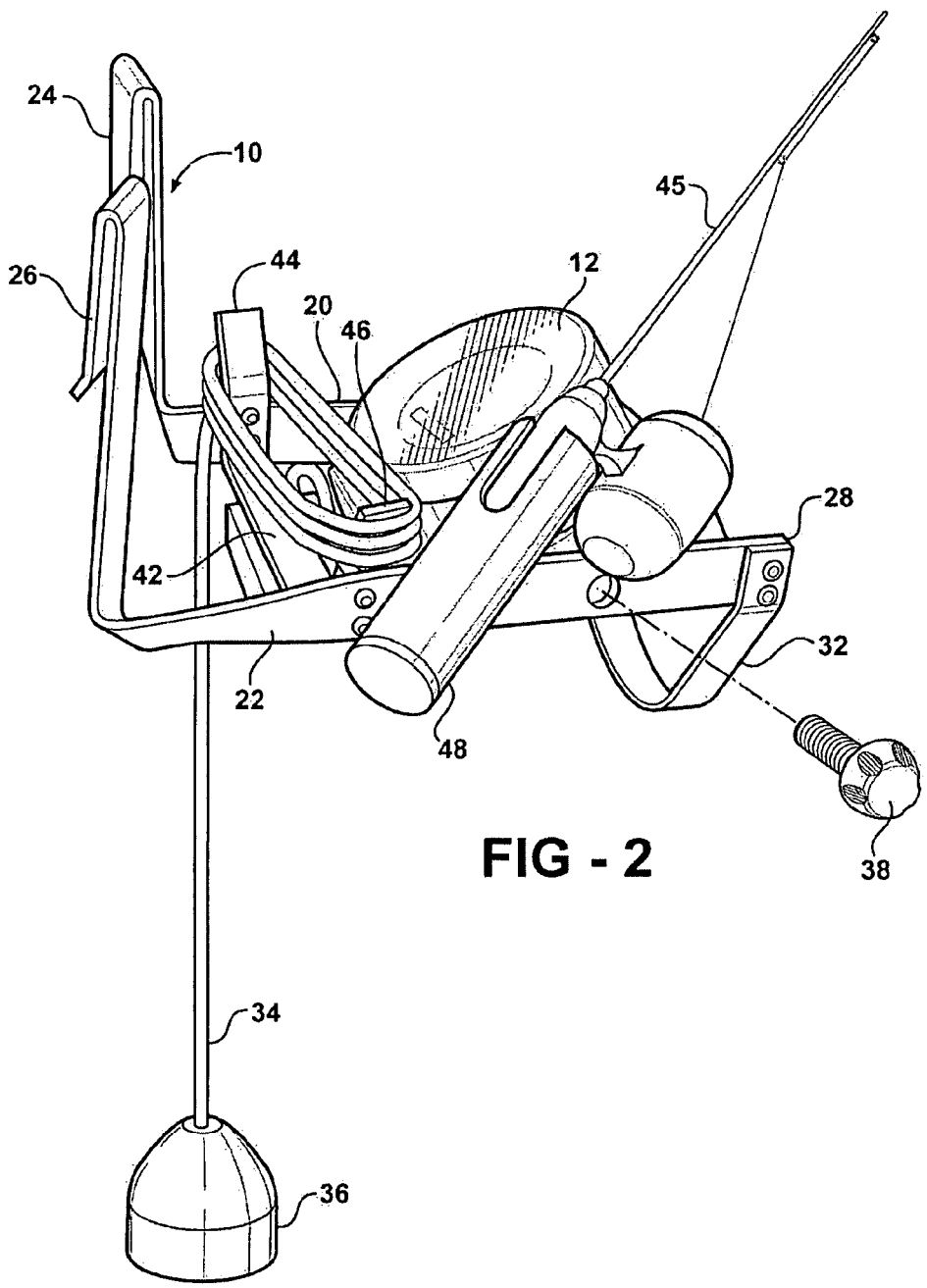
FIG. 2 is a perspective view of the bracket of FIG. 1 without the bucket.

Referring first to FIGS. 1 and 2, there is shown a bracket 10 fabricated primarily from flat aluminum stock for mounting a fish finder display head 12 to the outside surface 14 of a tapered cylindrical bucket or pail 16 having a carrying handle in the form of a bail 18. The bucket 16 will typically be of the six-gallon type fabricated by injection molding a suitable polymer such as high density polyethylene.

The bracket 10 comprises spaced apart parallel arms 20, 22 integrally joined at the inboard ends thereof by upwardly extending hook straps 24, 26 which, as shown in FIG. 1, may be hooked around the top edge of the bucket 16. The hook straps 24, 26 are toed in so as to conform to the cylindrical shape of the bucket 16 and extend downwardly and inwardly into the bucket approximately 4 inches. The arms 20, 22 have distal ends 28, 30 which stand out approximately 10 inches from the outside surface 14 of the bucket 16 when the bracket 10 is mounted on the bucket 16. Mounted by way of rivets to and extending between the distal ends 28, 30 is an optional tip-over guard 32 which is also made of flat aluminum strap stock and is bowed or curved into a generally U-shape so as to the below the plane of the arms 20, 22 to protect the display head in the event the bucket 16 tips over in the direction of the bracket 10.

As shown in FIGS. 1 and 2, the fish finder display head 12 is of the type having knob type hand screws 38, 40 threaded into the opposite sides of the body so as to be mounted gimbal style in a conventional mounting bracket which may be adapted for attachment to the instrument panel of a boat. In this case, the hand screws 38, 40 are used to attach the display head 12 to the bracket arms 20, 22 through holes 39 in the arms 20, 22. The holes 39 are about 4 inches inboard of the distal ends 28, 30 as shown.

As is more evident in FIG. 1, the arms 20, 22 as well as the hooks 24, 26 are joined together at sections which are bent at slightly more, than 90° so that the arms 20, 22 angle 2-5° upwardly relative to the horizontal when the bracket 10 is installed on the bucket 16.

A further feature is provided in the form of a generally U-shaped strap 42 also made of flat aluminum stock which is attached by rivets between the arms 20, 22 such that ears 44, 46 extend upwardly beyond the arms to provide a wrapping station for the transducer cable 34 which extends between the display head 12 of the fish finder and the sonic probe transducer 36 which the fisherman drops through the ice fishing hole into the water as shown in FIG. 1. The ears 44, 46 are bent outwardly slightly to provide a firm wrapping foundation for the cable 34.

Another optional feature is a socket-shaped rod holder 48 which is attached to the arm 22 inboard of the hole 39 to receive the butt end of a fishing rod 45.

In operation, the user attaches the fish finder display head 12 between the arms 20, 22 by means of the holes 39 and the hand screws 38, 40. This provides a gimbal-style mount wherein the display may be tipped or angled to the convenience of the fisherman. The cable 34 is wrapped in the preparation stage around the ears 44, 46 and deployed therefrom when the user reaches the fishing location. The tip-over guard 32 is oriented in such a way when the bracket 10 is attached to the side of the bucket 16 so as to protect the fish finder display head 12 in the event the bucket 16 inadvertently tips over.

Figure 3:
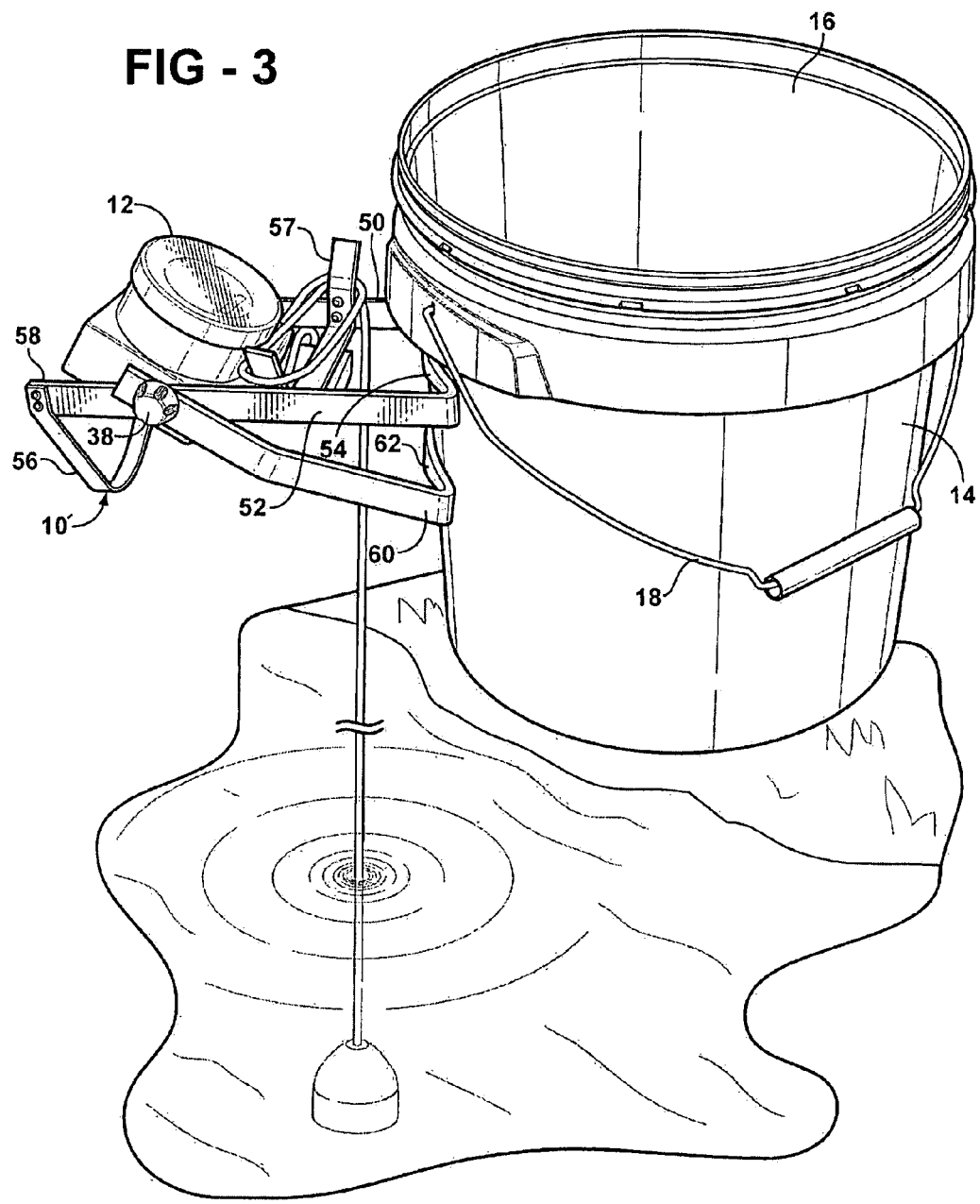
FIG. 3 is a perspective view of a second embodiment of the invention wherein the bracket is attached to the bucket or pail either by means of Bungee cords or screws or both and exhibits an optional second stabilizer bar attached to and extending at an angle from the main arms of the bracket.

Referring now to FIG. 3, a second embodiment of the invention is shown again and in connection with and mounted to the bucket 16 having the bail 18. In the embodiment of FIG. 3 the bracket comprises spaced apart arms 50, 52 made of flat aluminum stock integrally joined by a cylindrically curved strap section 54 which is adapted to lie conformingly against the outside surface 14 of the bucket 16. Alternatively, the strap section 54 may be flat to work with the generally rectangular pails, which some manufacturers prefer for certain uses such as the sale of pet food. A flat strap also allows the bracket to be mounted on a wall. In either case, three holes are provided in the strap to receive 10-32 threaded fasteners 55 which extend through holes in the bucket 16. A template (not shown) may be provided to guide the user as to hole spacing. A tip-over guard 56 of U-shaped, aluminum stock is attached by rivets between the distal ends 58 of the arms 50, 52 to protect the display head 12 in the event of an inadvertent upset of the unit. A cable winding station is provided by means of the U-shaped strap 57 which is attached by way of the arms 50, 52 inboard of the holes to receive the gimbal mount hand screws 38 which come with and form part of the fish finder display head 12. Rod holder 48 which is shown in the embodiment of FIGS. 1 and 2 is omitted from the embodiment of FIG. 3 but may be added as desired.

The embodiment of FIG. 3 can be permanently attached to a bucket 16 as described above. Alternatively, it can be attached by a Bungee cord wrapped around the bucket 16 with the hooks on the ends engaging the bracket 10 where the arms 52 meet the strap 54. In this case, the bracket preferably further comprises a stabilizer strap 60 which has a crossover member 62 also curved to conform to the outside surface 14 of the bucket 16. The stabilizer strap 60 is joined to the arms 50, 52 of the main bracket at the mounting holes for the fish finder display head 12 so that the stabilizer strap 60 may be angularly adjusted relative to the arms 50, 52 as desired by the user to provide adequate stabilization when mounting the fish finder and bracket to the pail or bucket 16.

A second parallel Bungee cord may be used in connection with the stabilizer bracket 60. It will be understood that the invention has been described with respect to illustrative and preferred embodiments thereof but that further modifications and additions to the invention will be apparent to those skilled in the art.

What is claimed is:

1. A bracket for mounting a portable fish finder to a hand-held bucket comprising:
    a pair of rigid L-shaped arms having non-coplanar inner end portions and outer end portions;
    a rigid brace connected to and extending between said outer end portions to hold said arms in a position such that said outer end portions are parallel and spaced apart sufficiently to form a gimbal mount for a fish finder;
    said inner end portions having hooked distal ends for attachment to the top rim of a handheld bucket; and
    said brace having opposite ear portions which extend above said outer end portions of said arms to provide a winding location for a fish finder cord.

2. An apparatus as described in claim 1 wherein said arms are made from aluminum strap.

3. An apparatus as defined in claim 1 further comprising a U-shaped tip-over guard connected to and extending between the distal ends of said outer end portions.

4. In combination:
    a gimbal mount fish finder having opposite mounting screws,
    a bracket for mounting the fish finder to a hand-held plastic bucket wherein said bracket comprises a pair of rigid L-shaped straps having inner end portions and outer end portions;
    a rigid brace connected to and extending between said outer end portions to hold said straps in a spaced-apart relationship to receive in gimbal mount said fish finder therebetween by way of said screws;
    said inner end portions having hooked distal ends for attachment thereof to the rim of a bucket; and
    said brace having opposite ear portions which, in the mounted configuration, extend above the outer end strap portions to provide a winding location for a cord attached to said fish finder.

5. The apparatus as defined in claim 4 further comprising a U-shaped rigid tip-over guard attached to and extending between and below the distal ends of said outer end portions to prevent engagement of said outer end portions with the ground surface in the event of a tip-over condition.

6. A bracket for mounting a portable fish finder to a bucket comprising a pair of parallel, spaced-apart arms of rigid strap material which, in the installed condition, lie in parallel substantially vertical planes;
    holes formed in said arms to provide a gimbal mount for a fish finder between said arms;
    a brace extending between and connected to said arms on one side of said holes, wherein said brace has ends that extend above said arms in the installed condition to provide a cord-wrapping station; and
    a tip-over guard extending between and connected to said arms on the other side of said holes.

7. A bracket as described in claim 6 wherein each of said arms is L-shaped to include inner portions which are substantially vertical in the installed condition and have hooked ends, each said arm further including outer portions integral with said inner portions, said strap material being twisted at the intersections of said inner and outer portions.

\* \* \* \* \*